United States Patent Office 3,014,622
Patented Dec. 26, 1961

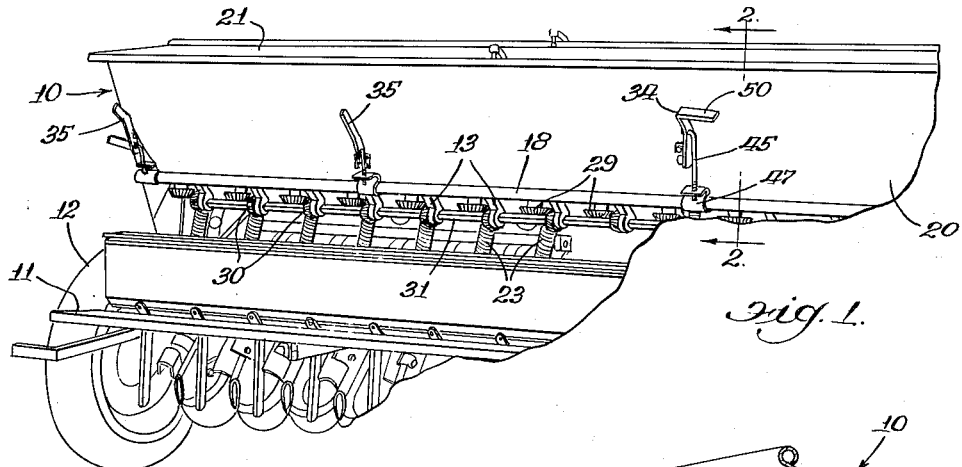
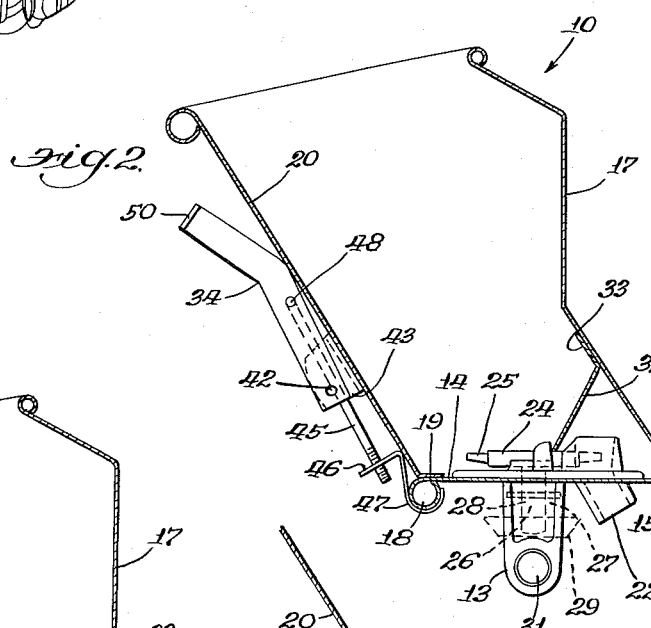
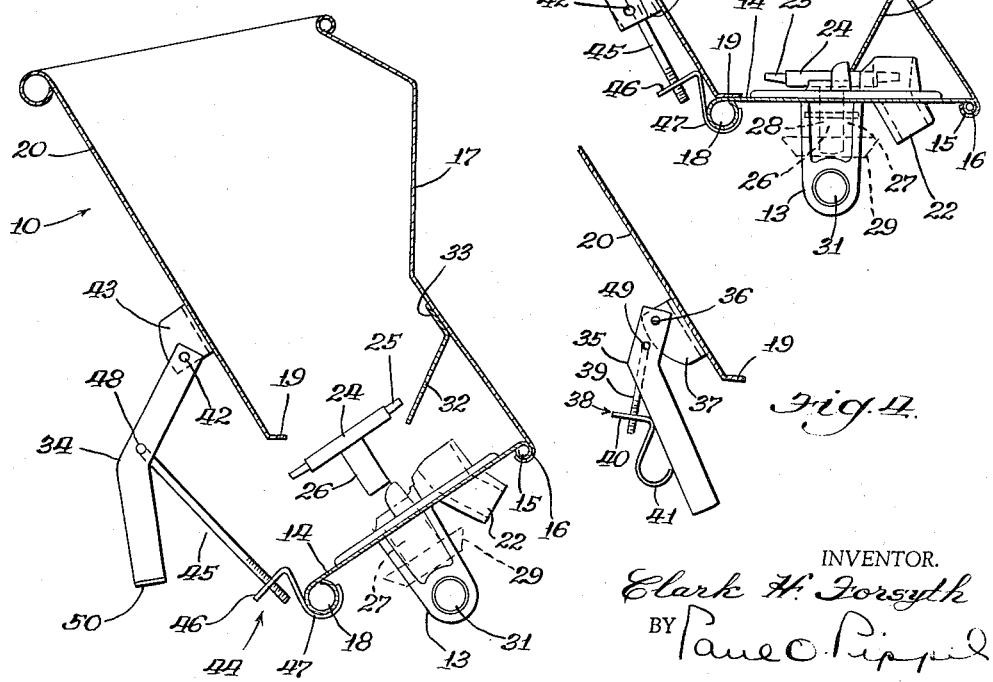

3,014,622
FERTILIZER DISTRIBUTOR
Clark H. Forsyth, Hamilton, Ontario, Canada, assignor to International Harvester Company, Chicago, Ill., a corporation of New Jersey
Filed Oct. 27, 1958, Ser. No. 769,863
5 Claims. (Cl. 222—185)

This invention relates to dispensing apparatus and particularly to fertilizer distributors.

The invention herein is particularly concerned with the type of fertilizer distributor having toothed or star feed wheels, wherein a plurality of such wheels, rotatable on vertical axes at the bottom of the hopper, feed fertilizer to discharge outlets along one side of the wheels, and a plate secured to one side of the hopper extends to a location adjacent the wheels at one side thereof, cutting off the outlets from the mass of fertilizer in the hopper so that the fertilizer is fed by the rotating wheels under the plate to the outlets.

In a conventional fertilizer distributor of the type referred to, due to the proximity of the plate to the feed wheels the latter cannot be removed until the cut-off plate is removed, the operation usually requiring first the removal of some fertilizer remaining in the hopper, and the entire procedure being tedious and time-consuming.

An object of the present invention is the provision of a fertilizer distributor having improved means for facilitating the cleaning of the hopper and dispensing apparatus.

Another object of the invention is the provision of an improved fertilizer distributor having a removable bottom so constructed and arranged as to accommodate disassembly of the operating parts and facilitating the removal of all fertilizer residues therefrom.

Another object of the invention is the provision of a fertilizer distributor of the type referred to herein having a bottom hinged to one side of the hopper and quick detachable latch means including means for holding the hopper bottom in a lowered position suspended by one or more of the latch means.

Other objects of the invention will become clear from the following detailed description when read in conjunction with the accompanying drawings wherein:

FIGURE 1 is a detail view in perspective of a portion of a fertilizer distributing attachment embodying the features of this invention;

FIGURE 2 is a section taken on the line 2—2 of FIGURE 1, on an enlarged scale, showing the dispensing apparatus in operating position;

FIGURE 3 is a view in section similar to FIGURE 2 but showing the hopper bottom in position for cleaning, and FIGURE 4 is a fragmentary view of one of the auxiliary locking means for the hopper bottom.

In the drawings, a fertilizer hopper 10 is mounted on a frame 11 supported by laterally spaced wheels 12, one at each end of the frame, and only one being shown in the drawings.

A plurality of supporting members 13 are affixed to and depend from a hopper bottom plate 14 having on its forward elongated edge a rolled bead 15 hingedly received in a hook or loop support 16 on the lower edge of the forward wall 17 of the hopper.

The rear elongated edge of hopper bottom 14 is rolled to provide a larger bead 18 which, in the assembled position of the hopper parts, abuts the lower face of a flange 19 at the lower end of the rear wall 20 of the hopper. A conventional lid 21, not shown in sectional views 2 and 3, is provided to cover the top of the hopper 10.

In the assembled position of the parts shown in FIGURE 2, the fertilizer distributor of this invention is filled with fertilizer and is ready for operation. A plurality of spaced outlets 22 are provided lengthwise of the hopper 10, for the discharge of fertilizer through suitable flexible tubes 23 to the ground. Fertilizer in the hopper 10 is fed to the outlets 22 by the provision of conventional star wheels 24, one for each of the outlets 22, having teeth 25 around the periphery thereof.

Each of the wheels 24 has a depending spindle 26 receivable in a sleeve member 27 slidable and rotatable in a suitable opening provided in the hopper bottom 14, and spindle 26 is secured to the sleeve 27 by any suitable means such as a pin 28 for transmission of drive therethrough.

Mounted on the lower end of sleeve 27 is a bevel gear 29 driven by another bevel gear 30, one of which is provided for each of the gears 29, and is mounted upon an elongated shaft 31 rotatably supported at the lower ends of hangers 13, and driven by any suitable means, not shown.

Fertilizer in hopper 10 is carried to the outlets 22 by the teeth 25 of wheels 24. In order to prevent packing of fertilizer around the outlets 22 and assure the uniform discharge of fertilizer therefrom, a cut-off plate 32 is provided having a flange 33 affixed to the hopper wall 17, the plate extending downwardly and inwardly. Plate 32 extends the full length of the hopper 10 and its lower edge terminates closely adjacent the upper face of the wheels 24, cutting off the forward lower edge of the hopper and the outlets 22 from the bulk of fertilizer in the hopper. Teeth 25 pick up fertilizer in the hopper and during the rotation carry it past the discharge outlets 22.

Until the present invention, the bottoms of fertilizer distributors of the type herein disclosed have been affixed to the hopper walls so that cleaning of fertilizer from the hopper has involved the difficult and tedious task of reaching in from the top, removing the cut-off plate 32, which has previously been bolted to the hopper wall, and then lifting out the feed wheels 24. In the novel construction provided by the present invention, applicant is able to affix the cut-off plate 32 to the hopper wall by welding, or the like, and can completely clean fertilizer from the box simply by lowering the hopper bottom about its hinged connection at 15, 16 from the position shown in FIGURE 2 to that shown in FIGURE 3. This is done without removing plate 32, and the wheels 24 are then easily lifted out and replaced.

The hopper bottom 14 is heavy and applicant has provided movable means facilitating lowering of the hopper bottom and holding it, if desired, in the lowered position for cleaning. This means comprises a main lever 34 and a plurality of auxiliary levers 35 disposed at spaced locations lengthwise of the hopper end. Each of the auxiliary levers 35 is pivotally mounted at one end upon a pin 36 carried by a lug 37 affixed to the rear wall 20 of the grain box. A clamping member 38 carried by a lever 35 includes a rod 39 bent at one end for pivotal connection 49 to the lever 35 at a location spaced from its pivot 36. The other end of rod 39 is threaded for adjustable reception in a threaded opening provided in the base 40 of a hook 41 adapted to receive and support the bead 18 of the hopper bottom. On a grain box such as shown in FIGURE 1 three or more auxiliary levers 35 and a single main lever 34 are mounted. Main lever 34 is mounted upon a pivot pin 42 carried by a lug 43 affixed to the wall 20 of the fertilizer box for swinging from the closed position shown in FIGURE 2 to the opened position of FIGURE 3. Supporting means in the form of a clamping member 44 similar to clamping member 38, includes a rod 45 bent at one end for pivotal connection to the lever 34 at a location spaced farther from pivot 42 than rod 39 is spaced from pivot 36. Rod 45 is longer than rod 39 and the free end thereof is threaded for adjustable reception in a threaded opening provided in the base 46 of a hook clamping element 47 adapted to partly encircle and support the bead 18.

With the hopper 10 in condition to receive fertilizer, the hopper bottom is in the position shown in FIGURE 2 with bead 18 abutting flange 19. In FIGURE 2 main lever 34 is in locking position with rod 45, its pivotal connection 48 to the lever being overcenter with respect to the lever pivot 42. Each of the auxiliary levers 35 have also been moved into locking position with rod 39 and the pivotal connection 49 thereof to the lever being overcenter with respect to the pivot pin 36.

When it is desired to clean fertilizer out of the bottom, each of the auxiliary levers 35 is released by moving the lever away from its overcenter position while the bottom is still held in position by the main lever 34. The hook 41 falls away from bead 18 and main lever 34, which is provided with a handle 50, is moved from the position of FIGURE 2 to a position corresponding to that of FIGURE 3 where bottom 14 has swung downwardly about the hinge connection 15, 16. If desired, the hopper bottom may be lifted from the hooks 16 and 47 and removed entirely or retained in the position of FIGURE 3, the operator removing star wheels 24 to facilitate cleaning out the remaining fertilizer. Tightening of the clamping elements 41 and 47 against the hopper bottom is facilitated by the provision of the adjustment between the threaded rods 39 and 45 and the base members 40 and 46.

Operation of the hinged or drop bottom fertilizer hopper of this invention should be clearly understood from the foregoing description. It should likewise be understood that the invention has been described in its preferred embodiment only and that modifications may be made therein without departing from the spirit of the invention or the scope of the appended claims.

What is claimed is:

1. In a fertilizer distributor, a hopper including side walls and a bottom having discharge outlets therein, hinge means connecting one edge of the hopper bottom to one of said side walls to accommodate lowering said bottom about the axis of said hinge, and means releasably locking the other edge of the bottom to the other side wall, comprising a lever pivoted at one end on said other side wall, a clamping member having a connection at one end to said lever at a location removed from the pivot thereof, an element at the other end of said clamping member operatively engageable with said other edge of the hopper bottom and adapted to support the latter in a lowered position, said lever being swingable to a position with said connection overcenter with respect to said other edge of the bottom to lock the latter to said other side wall.

2. The invention set forth in claim 1, wherein said clamping element is a hook and the adjacent edge of said hopper bottom is a bead adapted to be received in and supported by said hook during swinging of said lever to raise and lower the hopper bottom.

3. The invention set forth in claim 2, wherein said clamping member includes a link for connection to the lever having a threaded end, and said clamping element has a threaded opening to receive the threaded end of the link, whereby the effective length of said clamping member may be varied.

4. In a fertilizer distributor, a hopper including side walls and a bottom having discharge outlets therein, means serving as a hinge operatively connecting one edge of said hopper bottom to one of said side walls, whereby said bottom is swingable downwardly about the axis of said hinge, the other edge of said bottom having a rolled bead thereon, and means connecting said other edge of the bottom to the other side wall comprising a lever pivoted at one end on said other side wall, a clamping element having a hook part adapted to receive and support said bead, and a link connected to said clamping element and having a connection to said lever at a location spaced from the latter's pivot on said other side wall, said lever being swingable to a position wherein said connection is overcenter with respect to said pivot and said hook part to lock the hopper bottom to said other side wall.

5. In a fertilizer distributor, a hopper including side walls and a bottom having outlets therein, a hook formed on the lower edge of one of said walls, a mating bead formed on one edge of the hopper bottom and adapted to be removably received in said hook to form a hinge therewith to accommodate lowering the bottom about the axis thereof, and means mounted on the other of said side walls to support the other edge of said bottom and to raise and lower it about its hinge, comprising a hook member, a bead formed on the other edge of the hopper bottom adapted to be removably received in said hook member to be supported thereby, a lever pivoted on said other of said side walls, and means connecting said hook member to the lever for movement therewith upon swinging the lever about its pivot, the means connecting the hook member to said lever including means accommodating movement of the hook member to a position out of supporting engagement with said other edge of the hopper bottom.

References Cited in the file of this patent
UNITED STATES PATENTS

| | | |
|---|---|---|
| 703,962 | Lydon | July 1, 1902 |
| 1,714,182 | McNulty | May 21, 1929 |
| 2,769,579 | Morris | Nov. 6, 1956 |
| 2,851,200 | De Foa | Sept. 9, 1958 |
| 2,881,956 | Bjerre | Apr. 14, 1959 |
| 2,904,224 | Young | Sept. 15, 1959 |